(12) United States Patent
Tsuzuki et al.

(10) Patent No.: US 6,292,308 B1
(45) Date of Patent: *Sep. 18, 2001

(54) LENS BARREL

(75) Inventors: Masahiko Tsuzuki, Saitama-ken; Kazuya Matsuda, Kanagawa-ken; Takashi Watanabe, Tokyo; Katsumi Azusawa, Saitama-ken, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/974,144

(22) Filed: Nov. 19, 1997

Related U.S. Application Data

(63) Continuation of application No. 08/712,211, filed on Sep. 3, 1996, now abandoned, which is a continuation of application No. 08/246,993, filed on May 20, 1994, now abandoned.

(30) Foreign Application Priority Data

| May 27, 1993 | (JP) | ................................................. 5-126167 |
| May 27, 1993 | (JP) | ................................................. 5-126171 |
| May 27, 1993 | (JP) | ................................................. 5-126179 |

(51) Int. Cl.[7] .............................................. G02B 15/14
(52) U.S. Cl. ......................................... 359/704; 359/696
(58) Field of Search .................................... 359/694, 696, 359/697, 698, 704, 811, 813, 821, 825

(56) References Cited

U.S. PATENT DOCUMENTS

| 2,532,685 | * | 12/1950 | Walker | 359/696 |
| 4,008,951 | * | 2/1977 | Aimmelsbach | 359/696 |
| 4,626,077 | * | 12/1986 | Yamamoto | 359/703 |
| 4,784,479 | * | 11/1988 | Ikemori | 359/666 |
| 4,806,813 | | 2/1989 | Sumi et al. | 310/254 |
| 4,865,433 | * | 9/1989 | Okajima | 359/694 |
| 5,005,956 | * | 4/1991 | Kaneda | 359/698 |
| 5,016,993 | * | 5/1991 | Akitake | 359/696 |
| 5,144,491 | * | 9/1992 | Ushiro | 359/697 |
| 5,144,492 | * | 9/1992 | Iijima | 359/698 |
| 5,150,260 | * | 9/1992 | Chigira | 359/694 |
| 5,172,276 | * | 12/1992 | Ueyama | 359/813 |
| 5,204,710 | * | 4/1993 | Tsukamoto | 359/698 |
| 5,220,461 | * | 6/1993 | Inoue | 359/824 |
| 5,241,422 | * | 8/1993 | Shimada | 359/394 |
| 5,353,157 | | 10/1994 | Horiuchi | 359/676 |
| 5,391,866 | * | 2/1995 | Hoshino | 359/696 |
| 5,489,958 | * | 2/1996 | Katagiri | 354/195.12 |
| 5,489,959 | | 2/1996 | Akada | 354/234.1 |
| 5,689,746 | * | 11/1997 | Akada et al. | 396/508 |

FOREIGN PATENT DOCUMENTS

| 62113332 | 7/1987 | (JP) . |
| 6392310 | 6/1988 | (JP) . |
| 2114246 | 4/1990 | (JP) . |
| 4102815 | 4/1992 | (JP) . |

* cited by examiner

*Primary Examiner*—Georgia Epps
*Assistant Examiner*—Ricky Mack
(74) *Attorney, Agent, or Firm*—Robin,Blecker & Daley

(57) ABSTRACT

A lens barrel includes a lens barrel part generally cylindrical about an optical axis, a first driving part arranged to serve as a drive source for executing a focusing action, a second driving part arranged to serve as a drive source for executing a zooming action and a third driving part arranged to serve as a drive source for executing an aperture reducing action. The first, second and third driving parts are disposed externally of the lens barrel part and circumferentially of the optical axis, and may have arcuate outer surfaces which may not extend beyond the perimeter of the lens barrel part.

31 Claims, 6 Drawing Sheets

LENS BARREL

This is a continuation application under 37 CFR 1.62 of prior application Ser. No. 08/712,211, filed Sep. 3, 1996, abandoned, which is a continuation of Ser. No. 08/246,993, filed May 20, 1994, abandoned.

BACKGROUND OF THE INVENTION

1. Field of the Invention

This invention relates to a lens barrel having optical members including a zooming lens, a focusing lens and a diagram.

2. Description of the Related Art

For the lens barrel of the kind arranged to move some of various lens groups with a stepping motor which is employed as a drive source by transmitting its driving force through the meshing engagement of a feeding screw and a rack screw, the stepping motor has been arranged to be approximately in a cylindrical shape for the purpose of imparting universal applicability to the stepping motor.

Further, a motor unit which is approximately cylindrical in appearance has been arranged as an actuator at a diaphragm driving part in cases where a linear movement is necessary, like in the case of the diaphragm driving part of a video camera.

However, the conventional arrangement mentioned above has presented various problems as described below.

An effort to minimize the size of a lens barrel without lowering its optical performance results in an approximately cylindrical shape of the lens barrel.

However, in order to arrange a driving part for each of a zooming lens, a focusing lens and a diaphragm to have a sufficient torque, the outside diameter of the lens barrel increases with a driving load. The increase in the driving load makes the driving part hardly containable within the shape of the minimum size of the lens barrel.

In the case of the conventional lens barrel which is shown in FIG. 6, an actuator unit 59 for driving a magnifying power varying system or a focusing system is formed with a U-shaped sheet metal member 59a arranged to support a motor 59b which is provided with a screw shaft 59c. The U-shaped sheet metal member 59a is screwed to the lens barrel 51. The lens barrel 51 has a cutout part 51a which is provided for mounting the actuator unit 59 thereon and extends over the whole moving range of the power varying system or the focusing system.

However, the structure of making the U-shaped sheet metal member 59a support the actuator unit 59 and of screwing the U-shaped sheet metal 59a to the lens barrel 51 necessitates the cutout part 51a of the lens barrel 51 to be large. The large cutout part 51a lowers the strength of the lens barrel 51 and also makes it difficult to attain a required degree of precision. The provision of the U-shaped sheet metal member 59a brings forth another problem which lies in that the meshing engagement of rack teeth (not shown) and the screw shaft 59c cannot be ascertained in their assembled state.

Further, for the lens barrel of this kind, use is generally made of a diaphragm unit including, in one unified body, a plurality of diaphragm blades, a diaphragm base plate and a blade retaining member which are arranged to sandwich the diaphragm blades therebetween, and a diaphragm driving part. The diaphragm unit which is arranged in this manner is disposed and fixed in position within the lens barrel in a state of being completely independent of the lens barrel.

However, the unitizing arrangement of the diaphragm device inevitably causes an increase in number of parts of the diaphragm device. The increased number of parts causes not only an increase in cost but also an increase in space required, and thus has resulted in a larger size of the lens barrel.

Further, depending on the mounting precision, the diaphragm unit tends to cause a discrepancy between an optical axis and the center of the diaphragm and thus has caused one of four corners of an image plane to become dark or, in the worst case, to be eclipsed.

SUMMARY OF THE INVENTION

One aspect of this invention resides in the provision of a lens barrel which is arranged to permit reduction in size by making driving parts for a zooming system, a focusing system and a diaphragm respectively to be in an arc form i.e., circumferentially of the lens barrel optical axis with arcuate outer surfaces which may not extend radially outwardly of an outer circumference of a lens barrel part, and disposing the driving parts externally of the lens barrel which has approximately a cylindrical shape.

Another aspect of this invention resides in the provision of a lens barrel of the kind arranged to move an optical member in the direction of an optical axis by rotating a screw shaft with a motor and by axially moving a meshing member which meshes with the screw shaft, wherein an aperture part is provided in an approximately tubular member so as to cause the meshing member to mesh with the screw shaft in a position of the aperture part.

A further aspect of this invention resides in the provision of a lens barrel, wherein a diaphragm member is set in position in a state of being sandwiched in the direction of an optical axis with one of the sandwiched sides thereof supported by a lens holding member.

These and other aspects and features of this invention will become apparent from the following detailed description of embodiments thereof taken in connection with the accompanying drawings.

DETAILED DESCRIPTION OF THE PREFERRED EMBODIMENTS

Figure 1:
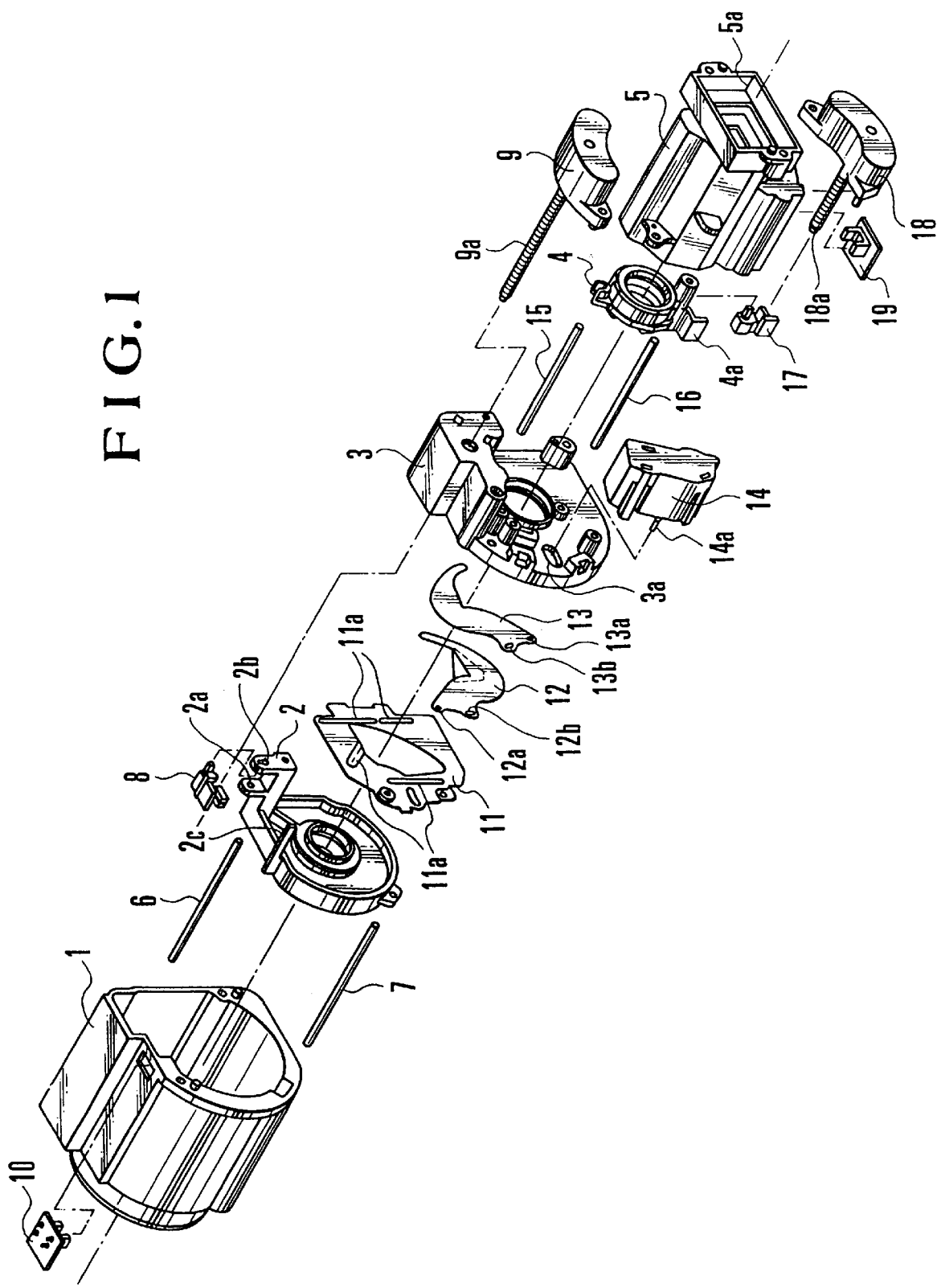
FIG. 1 is an exploded oblique view showing the structural arrangement of a lens barrel arranged according to this inventions as a first embodiment thereof.

FIG. 1 shows the features of a lens barrel which is arranged according to this invention as a first embodiment thereof. Referring to FIG. 1, the lens barrel is arranged as follows. A first lens holding member 1 is arranged to hold a first lens group. A second lens holding member 2 is arranged to hold a second lens group and to vary a magnifying power by moving the second lens group. A third lens holding member 3 which is stationary is arranged to hold a third lens. A fourth lens holding member 4 is arranged to hold a fourth lens group and to perform focusing by moving the fourth lens group. A rear fixed tube 5 is provided with a mount part 5a on which an image sensor is mounted.

The second lens holding member 2 is movably supported by guide bars 6 and 7 which have their two ends secured to the first and third lens holding members 1 and 3. The second lens holding member 2 is thus arranged to be movable in the direction of an optical axis.

A rack teeth part 8 which is supported by holes 2a and 2b formed in the second lens holding member 2 is arranged to mesh with an output screw shaft 9a of a stepping motor 9 of an arc form having an arcuate outer surface which is secured to the third lens holding member 3 as a driving part for zooming. When the output screw shaft 9a of the stepping motor 9 rotates, the second lens holding member 2 is driven to move in the direction of the optical axis.

A protruding part 2c of the second lens holding member 2 constitutes a means for detecting the position of the second lens group in conjunction with a sensor switch 10 which is secured to the first lens holding member 1. The initial position of the second lens holding member 2 is determined on the basis of the output of the sensor switch 10.

The third lens holding member 3 is provided with guide pins (not shown) which are respectively inserted in holes 12a and 13a formed in diaphragm blades 12 and 13. The diaphragm blades 12 and 13 are arranged to be swingable on these guide pins in the direction of orthogonally intersecting the optical axis along guide rails (not shown) provided on the third lens holding member 3 and guide rails 11a provided on a blade retaining plate 11. The guide rails 11a are formed with parts of the blade retaining plate 11 caused to protrude in the shape of rails by press work. A diaphragm driving part 14 of an arc form is secured to the third lens holding member 3. The output shaft 14a of the diaphragm driving part 14 is inserted into slots 12b and 13b formed in the diaphragm blades 12 and 13. The diaphragm blades 12 and 13 are driven when the output shaft 14a swings along an arcuate hole 3a which is provided in the third lens holding member 3.

The fourth lens holding member 4 is movably supported by guide bars 15 and 16 which have their two ends secured to the third lens holding member 3 and the rear fixed tube 5. The fourth lens holding member 4 is thus arranged to be movable in the direction of the optical axis.

Similarly to the second lens holding member 2, a rack teeth part 17 which is supported by the fourth lens holding member 4 is arranged to mesh with an output screw shaft 18a of a stepping motor 18 having an arcuate outer surface which is secured to the rear fixed tube 5 as a driving part for focusing. The fourth lens holding member 4 is thus arranged to be driven in the direction of the optical axis when the output screw shaft 18a of the stepping motor 18 rotates.

A protruding part 4a which is provided on the fourth lens holding member 4 constitutes a means for detecting the position of the fourth lens group in conjunction with a sensor switch 19 which is secured to the rear fixed tube 5. The initial position of the fourth lens holding member 4 is determined on the basis of the output of the sensor switch 19.

Figure 2:
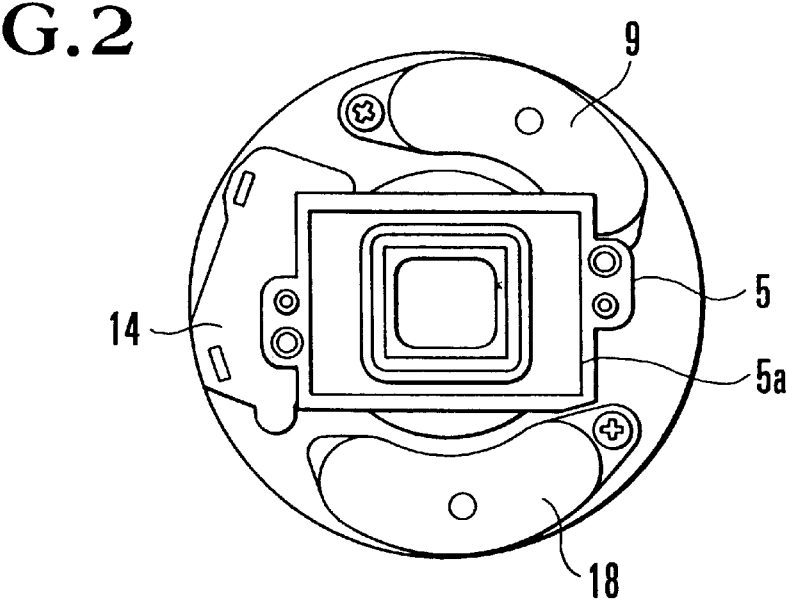
FIG. 2 is a plan view showing the lens barrel as viewed from the rear side thereof (on the side on which a focal plane is located) with all the parts shown in FIG. 1 in an assembled state.

FIG. 2 shows the lens barrel which is the first embodiment of this invention as viewed from the side of the focal plane thereof. Referring to FIG. 2, the driving parts (or actuators or stepping motors) 9, 18 and 14, each having an arcuate outer surface, for zooming, focusing and the diaphragm are disposed between the diaphragm blades 12 and 13 and the image sensor (mounted on the mount part 5a) along an external form of the lens barrel having a cylindrical shape and in such positions where a light flux can be stopped down and where they permit reduction in size of the external form of the lens barrel. The lens barrel is thus can be arranged to have an approximately cylindrical external shape. Incidentally, the upper and lower positional relation between the zooming and focusing stepping motors 9 and 18 may be conversely arranged. Driving parts 9, 18 and 14 will be seen to be disposed along respective individual axes spaced from and parallel to the optical axis.

Figure 3:
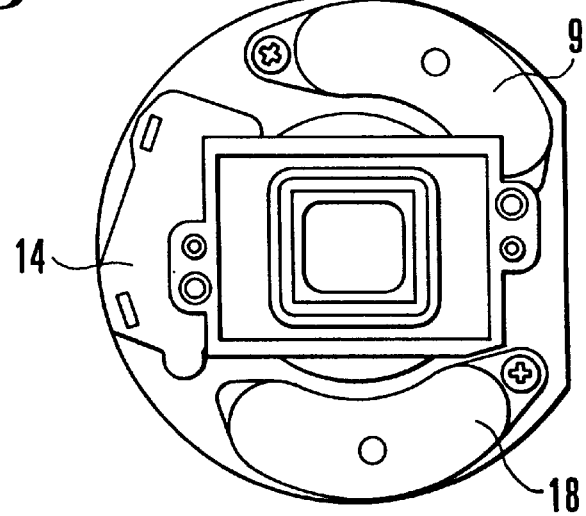
FIG. 3 is a plan view showing a lens barrel arranged as a second embodiment of this invention.

A lens barrel according to a second embodiment of this invention is arranged as shown in FIG. 3, which shows it as viewed from the side of a focal plane. Referring to FIG. 3, the actuators 9, 18 and 14, each having an arcuate outer surface for zooming, focusing and the diaphragm are disposed externally of the cylindrical lens barrel in such a way as to allow the lens barrel to have an approximately cylindrical external shape. In the case of the second embodiment, however, one side of the shape of the lens barrel which is opposed to the diaphragm actuator 14 is cut away for the purpose of reducing the dimension in the direction of the width of the lens barrel. Incidentally, the upper and lower positional relation between the zooming and focusing stepping motors 9 and 18 may be conversely arranged.

Figure 4:
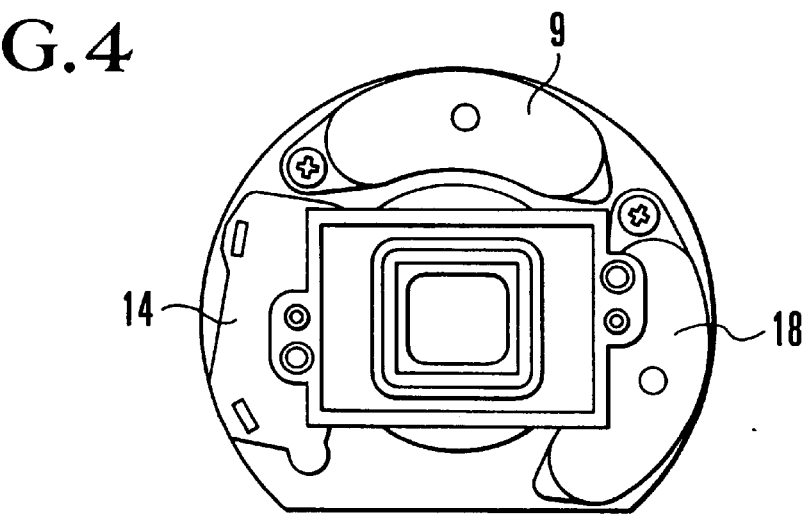
FIG. 4 is a plan view showing a lens barrel arranged as a third embodiment of this invention.

FIG. 4 shows a lens barrel arranged as a third embodiment of this invention as viewed from the side of a focal plane. Referring to FIG. 4, the actuators 9, 18 and 14, each having an arcuate outer surface for zooming, focusing and the diaphragm are disposed along an external form of the cylindrical lens barrel in such a way as to allow the lens barrel to have an approximately cylindrical external shape. In the case of the third embodiment, however, one side of the shape of the lens barrel opposed to the actuator 9 is cut away for reducing the dimension in the direction of the height of the lens barrel. Incidentally, the upper and lower positional relation between the zooming and focusing stepping motors 9 and 18 may be conversely arranged.

Each of the first, second and third embodiments described above is arranged such that the driving parts for zooming, focusing and the diaphragm are made having an arcuate outer surface and disposed externally of the approximately cylindrical lens barrel. By virtue of this arrangement, the lens barrel can be saved from having protruding parts, thereby permitting reduction in size. Further, each of these driving parts is arranged between the image sensor and the diaphragm blades in a place where a light flux is stopped down. That arrangement permits minimization of the size of the lens barrel.

This advantageous effect is enhanced further with the dimension in one direction of the lens barrel shortened in a manner as shown in FIG. 3 or 4.

Figure 5:
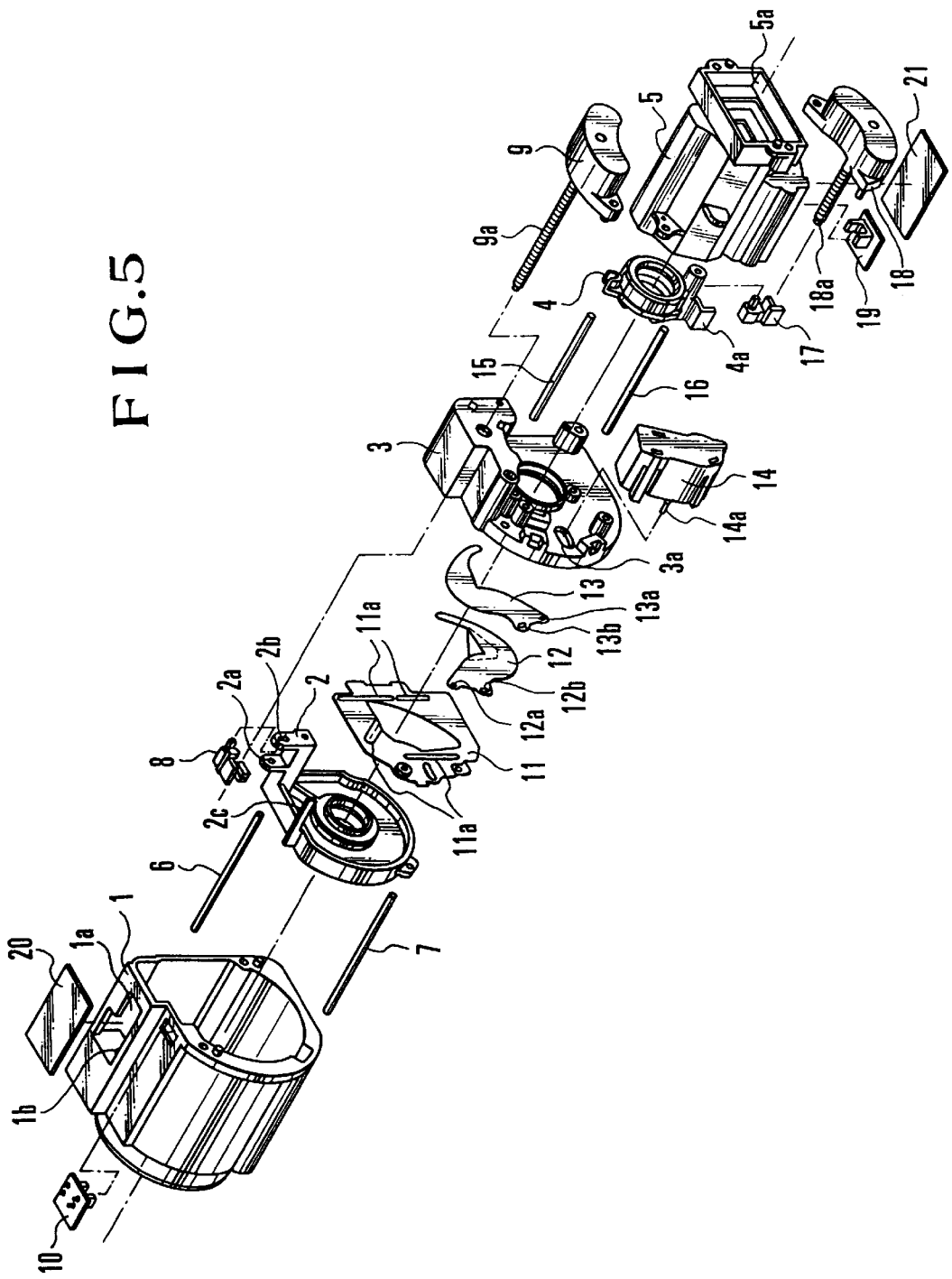
FIG. 5 is an exploded oblique view of a lens barrel arranged as a fourth embodiment of this invention.
Figure 6:
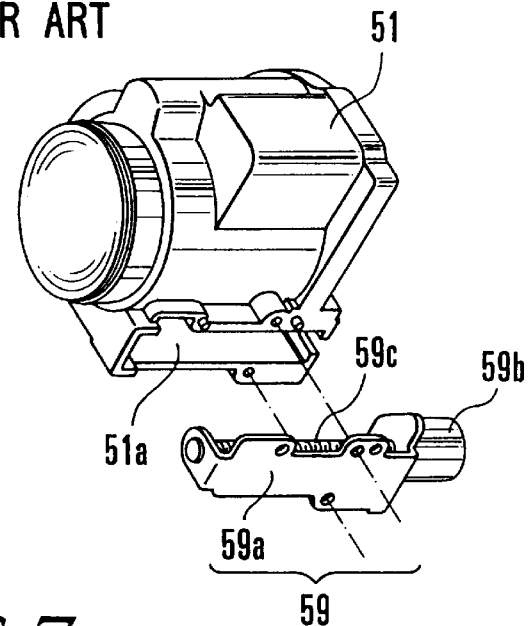
FIG. 6 is an oblique view showing the arrangement of the conventional lens barrel.

FIG. 5 best represents the features of a fourth embodiment of this invention. In FIG. 5, all the parts that are arranged in the same manner as those of the first embodiment are indicated by the same reference numerals and the details of them are omitted from description.

The fourth embodiment differs from the first embodiment in the following points.

The front end of the output screw shaft 9a of the stepping motor 9 is supported by a bearing part 1b of the first lens holding member 1 and, the stepping motor 9 itself is secured to the third lens holding member 3, so that a U-shaped sheet metal member which has been needed according to the conventional arrangement is no longer required and is thus omitted from the structure of the fourth embodiment.

The first lens holding member 1 is provided with an aperture part 1a which is arranged in a part of the moving range of the second lens holding member 2 to permit work for meshing the rack teeth part 8 and the output screw shaft 9a of the stepping motor 9 with each other and for confirmation of the meshing engagement. This aperture part 1a is used also as an escape part for the rack teeth part 8 during the process of assembly work (meshing engagement) on the rack teeth part 8 and the output screw shaft 9a of the stepping motor 9.

A cover member 20 is formed in such a shape as to cover the aperture part 1a of the first lens holding member 1 and is secured to the first lens holding member 1 by snap fitting with a hooked claw or by bonding. While the description given here applies to the magnifying power varying system, the moving members of the focusing (focus adjustment) system are also arranged in the same manner.

The rear fixed tube 5 is provided with an aperture part (not shown) in a part of the moving range of the fourth lens holding member 4 for meshing the rack teeth part 17 and the output screw shaft 18a of the stepping motor 18 with each other. The aperture part is used also as an escape part for the rack teeth part 17 during the process of assembly work (meshing engagement) on the rack teeth part 17 and the output screw shaft 18a of the stepping motor 18.

A cover member 21 is formed in such a shape as to cover the aperture part (not shown) of the rear fixed tube 5 and is secured to the rear fixed tube 5 either by snap fitting with a hooked claw or by bonding.

In the fourth embodiment described above, the cover members 20 and 21 which cover the aperture parts are either made of the same material as the first lens holding member 1 and the rear fixed tube 5 which are opaque, or adhesive tape pieces are applied to cover the aperture parts. Further, if there is no fear of leakage of light, the cover members 20 and 21 may be made of a transparent material. The use of a transparent material for these cover members 20 and 21 facilitates making a check for the meshing state of the output screw shafts 9a and 18a with the rack teeth parts 8 and 17.

Since it suffices to form the above-stated apertures just in small sizes in the case of the fourth embodiment, the lens barrel can be arranged to retain a sufficient strength and, therefore, can be made with an adequate precision. Further, since the meshing work can be done on the engaging members by utilizing the aperture parts, the assembly work can be efficiently carried out, because it is no longer necessary to mesh the meshing members with the output screw shafts within the lens barrel.

While the stepping motor has been mounted by mounting a U-shaped sheet metal member according to the conventional method, the invented method obviates the necessity of mounting the U-shaped sheet metal member, so that the arrangement of the fourth embodiment is not only advantageous in terms of cost but also permits reduction in weight of the lens barrel.

Figure 7:
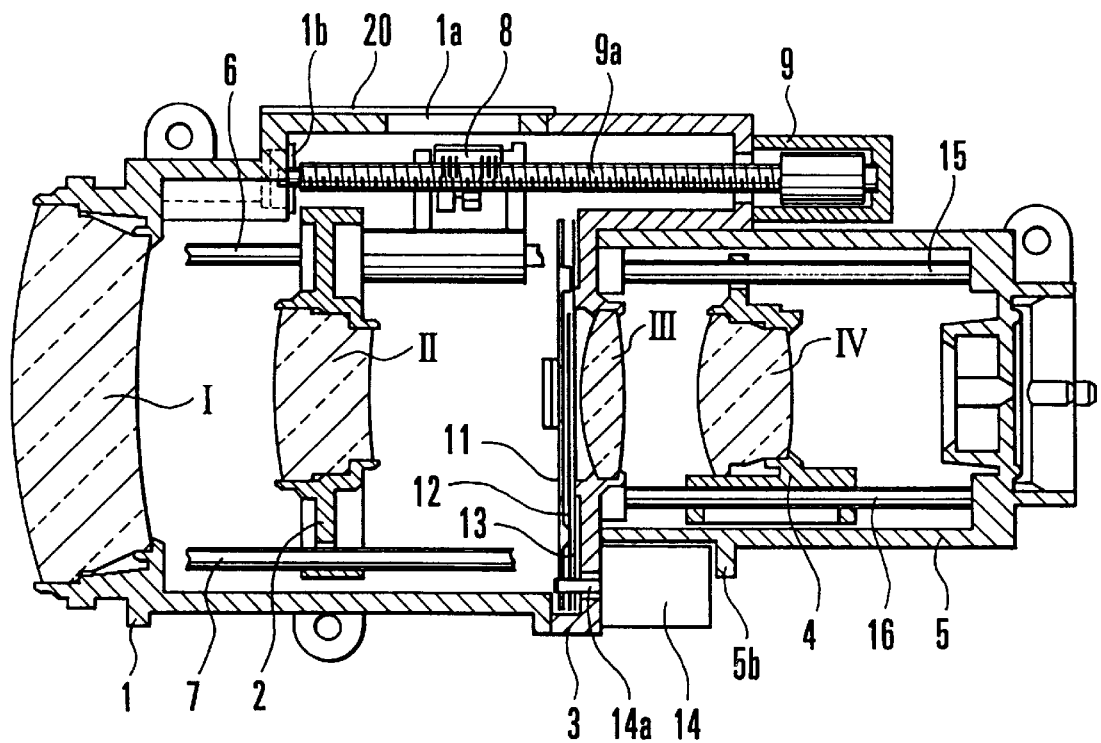
FIG. 7 is a sectional view showing the essential parts of a lens barrel arranged according to this invention as a fifth embodiment thereof.
Figure 8:
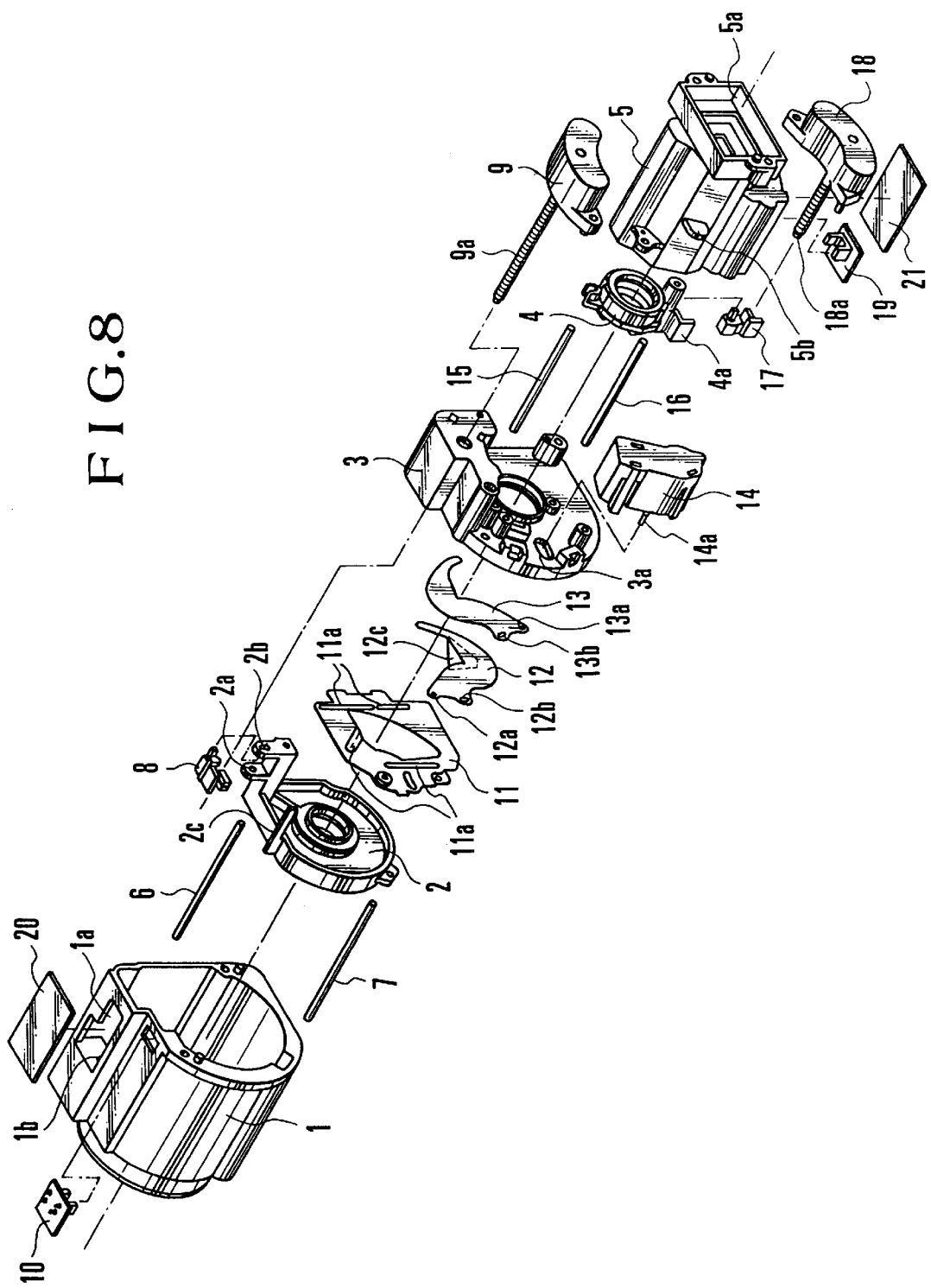
FIG. 8 is an exploded oblique view of the lens barrel shown in FIG. 7.

A fifth embodiment of this invention is next described as follows, FIG. 7 shows in a sectional view the essential parts of a lens barrel which is arranged as the fifth embodiment. FIG. 8 shows the lens barrel in an exploded oblique view. The fifth embodiment is arranged almost in the same manner as the fourth embodiment which has been described above. Therefore, all parts that are of the same construction as those of the fourth embodiment are indicated by the same reference numerals and the details of them are omitted from description.

Figure 9:
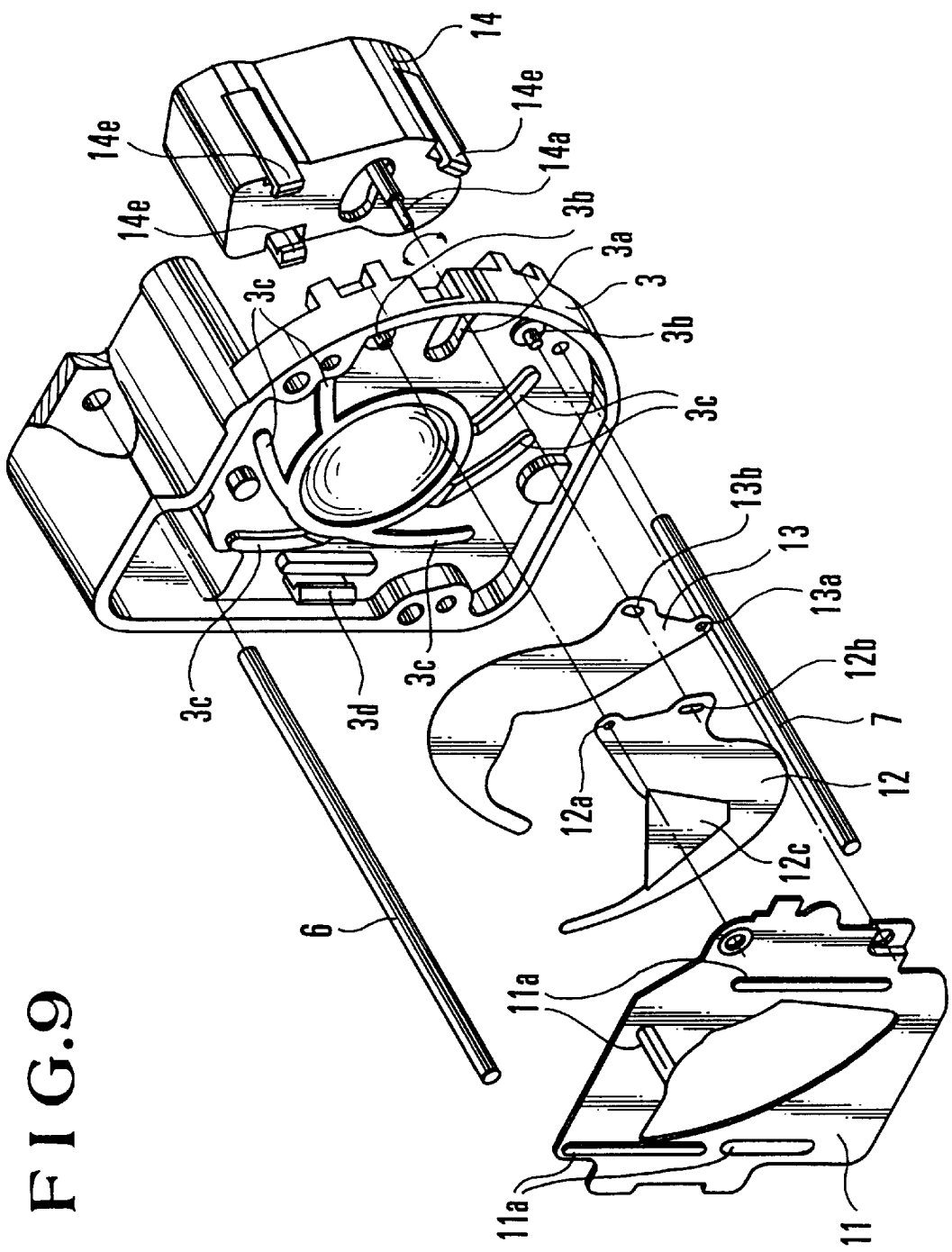
FIG. 9 is an exploded oblique view showing the essential parts of the lens barrel shown in FIG. 7.

Referring to FIGS. 7 and 8, the lens barrel includes diaphragm blades 12 and 13. An ND filter 12c (not shown in FIG. 7) is attached to the diaphragm blade 12. The diaphragm blades 12 and 13 are interposed between the blade retaining plate (sandwiching member) 11 and the third lens holding member 3 and are arranged to be driven by the swinging movement of an output shaft 14a of the diaphragm driving part 14 in the directions of arrows as shown in FIG. 9, which is an oblique view showing in detail the essential parts of the diaphragm part. Guide pins 3b which are formed integrally with the third lens holding member 3 are inserted into round holes 12a and 13a which are formed in the diaphragm blades 12 and 13. The output shaft 14a of the diaphragm driving part 14 is inserted through an aperture part 3a of the third lens holding member 3 into slots 12b and 13b formed in the diaphragm blades 12 and 13. The blade retaining plate 11 is snap-fitted and carried by a claw part 3d, etc., of the third lens holding member 3. The diaphragm blades 12 and 13 are thus driven to stop down a light flux by swinging in the direction orthogonally intersecting the optical axis according to the movement of the output shaft 14a of the diaphragm driving part 14.

In this instance, guide rails 3c which are formed integrally with the third lens holding member 3 and guide rails 11a which are formed integrally with the diaphragm retaining plate 11 enable the diaphragm blades 12 and 13 to smoothly move without coming into contact with each other.

Further, a plurality of claw parts 14e which are formed on the outside part of the diaphragm driving part 14 enable the diaphragm driving part 14 to be secured to the third lens holding member 3 by fittingly engaging (snap fitting) hook parts (not shown) which are provided on the third lens holding member 3 in positions where they are opposed to to the claw parts 14e. As shown in FIG. 7, the rear fixed tube 5 is provided with a protruding part 5b in the rear of the diaphragm driving part 14 on one side opposite to the side on which the rear fixed tube 5 is secured to the third lens holding member 3. The dimensional arrangement of the protruding part 5b is such that when any impact is applied, for example, in the direction of the optical axis, the rear end part of the diaphragm driving part 14 abuts on the protruding part 5b before the claw parts 14e completely disengage from the the third lens holding member 3 to prevent the diaphragm driving part 14 from pulling off.

The diaphragm part can be arranged in the form of the conventional diaphragm unit by first mounting the diaphragm blades 12, 13, the blade retaining plate 11 and the diaphragm driving part 14 on the third lens holding member 3 during the process of assembly work. The assembly work can be further facilitated by arranging the third lens group III to be set in place by inserting it from a direction opposite to the diaphragm blades 12 and 13.

Further, the arrangement of mounting the diaphragm blades 12 and 13 directly on the third lens holding member 3, as mentioned in the foregoing, dispenses with the conventional diaphragm base plate and gives some space allowance in the direction of thrust to an extent corresponding to a space required for the diaphragm base plate.

The arrangement of having the guide pins 3b for the diaphragm blades 12 and 13 formed integrally with the third lens holding member 3 ensures that the center of diaphragm aperture defined by the diaphragm blades 12 and 13 deviates from the optical axis only to an extent less than the conventional lens barrel, so that the optical performance can be greatly enhanced.

While the embodiment has each of the motor driving parts formed with arcuate outer surfaces for the purpose of making the whole lens barrel compact, it goes without saying that the same advantageous effect is attainable in this respect by using circular actuators (driving parts) instead of using actuators with arcuate outer surfaces. Further, while the embodiment uses the diaphragm blades of a swinging type, the diaphragm blades may be replaced with linearly moving diaphragm blades.

The rear fixed tube 5 is provided with the protruding part 5b for preventing the diaphragm driving part 14 from pulling off from the lens barrel, with a predetermined amount of clearance provided there. This arrangement may be changed to impart some resilience to the protruding part 5b in such a way as to charge the diaphragm driving part.

According to the structural arrangement of the lens barrel of the fifth embodiment, as described above, the diaphragm blades, the blade retaining plate and the diaphragm driving part are assembled to be located within the lens holding member. This arrangement not only effectively permits reduction in number of parts for cost reduction but also permits effective space utilization for reduction in size of the whole lens barrel. Further, apposite procedures for assembly permit the diaphragm part to be discretely handled as a diaphragm unit, so that the advantage of the conventional arrangement of handling the diaphragm part as a diaphragm unit can be retained without impairing it.

Further, the structural arrangement of the lens barrel permits the aperture center of the diaphragm blades to be easily set in precise alignment with the optical axis and not to easily deviate from the latter. This effectively prevents an image plane from being eclipsed and enables its four corners to have approximately equal luminance, so that a picture of high quality can be obtained. Further, the diaphragm driving part is arranged to be not deviating from its position, fixed in place by means of claw parts and prevented from pulling off by means of a pulling-off preventing mechanism provided on a separately arranged fixed member. The arrangement thus not only permits reduction in number of manufacturing processes but also ensures a sufficient impact resistance.

What is claimed is:

1. A lens barrel comprising:
   a lens barrel part cylindrical about an optical axis;
   a first driving part arranged to serve as a drive source for executing a focusing action;
   a second driving part arranged to serve as a drive source for executing a zooming action;
   a third driving part arranged to serve as a drive source for executing an aperture changing action;
   wherein said first, second and third driving parts are disposed externally of said lens barrel part and along respective individual axes spaced from and parallel to said optical axis, housings of said first, second and third driving parts not extending beyond the perimeter of said lens barrel part.

2. A lens barrel according to claim 1, further including a diaphragm member and an image sensor and wherein said first, second and third driving parts are disposed between said diaphragm member and said image sensor.

3. A lens barrel according to claim 2, wherein said first and second driving parts are disposed in positions generally opposite one another across said optical axis.

4. A lens barrel according to claim 2, wherein one of said first and second driving parts is disposed in a first position radially of said optical axis while the other of said first and second driving parts and said third driving part are disposed respectively in a second position and a third position radially of said optical axis, said second and third positions being generally opposite one another across said optical axis.

5. A lens barrel according to claim 2, further including an output screw shaft protruding from at least one of said first driving part and said second driving part and a member for moving a lens in contact with said output screw shaft, said member being arranged to move, when said output screw shaft rotates, in such a way as to cause said lens to move.

6. A lens barrel according to claim 1, wherein said first and second driving parts are disposed in positions generally opposite one another across said optical axis.

7. A lens barrel according to claim 1, wherein one of said first and second driving parts are disposed in a first position radially of said optical axis while the other of said first and second driving parts and said third driving part are disposed respectively in a second position and a third position radially of said optical axis, said second and third positions being generally opposite one another across said optical axis.

8. A lens barrel according to claim 1, further including an output screw shaft protruding from at least one of said first driving part and said second driving part and a member for moving a lens in contact with said output screw shaft, said member being arranged to move, when said output screw shaft rotates, in such a way as to cause said lens to move.

9. A lens barrel according to claim 5, wherein said lens is movably supported by guide bars.

10. A lens barrel comprising:
    a drive source;
    a screw shaft rotated by the drive source;
    a lens holding means for holding a lens, said lens holding means having a shaft contact member which contacts the shaft and is moved in an optical axis direction by the rotation of the shaft, and moving in the optical axis direction by the movement of the contact member; and
    a cylindrical member for covering the holding means, said cylindrical member having an aperture through which said contact member is seen.

11. A lens barrel according to claim 10, wherein said cylindrical member has a bearing part arranged to support an end of said screw shaft for rotation.

12. A lens barrel according to claim 10, further comprising a cover member arranged to cover said aperture.

13. A lens barrel according to claim 10, wherein the connection work between the contact member and screw shaft is made through said aperture.

14. A lens barrel comprising:
    a lens holding member for holding a lens;
    a diaphragm device for adjusting an amount of light by moving a diaphragm member; and
    a member fixed on the lens holding member so as to sandwich the movable diaphragm member between the lens holding member and the sandwiching member.

15. A lens barrel according to claim 14, wherein said lens holding member is provided with a rotary support shaft part and a protruding guide part which are formed on a face of said lens holding member facing said diaphragm member.

16. A lens barrel according to claim 14, wherein a driving part serving as a drive source for said diaphragm device is secured to said lens holding member.

17. A lens barrel according to claim 16, wherein said driving part is releasably secured to said lens holding member, further comprising means for preventing separation of said driving part and said lens holding member.

18. A lens barrel comprising:
- a holding means for holding a lens, said holding means having a driven part;
- a drive mechanism having a driving part which moves the driven part in the optical axis direction so as to move the holding means in the optical axis direction; and
- a housing for housing the holding means, said housing having an aperture through which the driven part is seen.

19. A lens barrel according to claim 18, further comprising a cover supported by said housing member for selectively closing aperture.

20. A lens barrel according to claim 19, wherein said aperture opens into an exterior surface of said housing.

21. A lens barrel according to claim 18, wherein said aperture opens into an exterior surface of said housing.

22. A lens barrel according to claim 18, wherein the connection work between the driving part and the driven part is made through said aperture.

23. A lens barrel having an optical axis and comprising:
- a first driving part having an arcuate outer surface arranged to serve as a drive source for executing a focusing action;
- a second driving part having an arcuate outer surface arranged to serve as a drive source for executing a zooming action;
- a third driving part having an arcuate outer surface arranged to serve as a drive source for executing an aperture changing action;
- wherein said first, second and third driving parts are disposed along respective individual axes spaced from and parallel to said optical axis externally of said lens barrel which has a cylindrical shape.

24. A lens barrel comprising:
- a zoom system, a diaphragm and a focus system arranged from object to image;
- a first arc-formed drive portion for driving the zoom system; and
- a second arc-formed drive portion for driving the focus system, wherein the lens barrel has an almost cylindrical outer shape at its portion on the image side of the diaphragm, and the first and second drive portions are arranged along the cylindrical outer shape of the lens barrel on the image side of the diaphragm.

25. A lens barrel comprising:
- a first fixed system, a zoom system, a diaphragm, a second fixed system and a focus system arranged from object to image;
- a first arc-formed drive portion for driving the zoom system;
- a second arc-formed drive portion for driving the focus system, wherein the first and second drive portions are arranged on the image side of the diaphragm so that the lens barrel has an almost cylindrical outer shape at its portion on the image side of the diaphragm.

26. A lens barrel comprising:
- a zoom system, a diaphragm and a focus system arranged from object to image;
- a first arc-formed drive portion for driving the zoom system;
- a second arc-formed drive portion for driving the focus system; and
- a third arc-formed drive portion for driving the diaphragm, wherein the first an second and the third drive portions are arranged on the image side of the diaphragm so that the lens barrel has an almost cylindrical outer shape at its portion on the image side of the diaphragm.

27. A lens barrel comprising:
- a first fixed system, a zoom system, a diaphragm, a second fixed system and a focus system from object to image;
- a first arc-formed drive portion for driving the zoom system;
- a second arc-formed drive portion for driving the focus system; and
- a third arc-formed drive portion for driving the diaphragm, wherein the first, second and third drive portions are arranged on the image side of the diaphragm so that the lens barrel has an almost cylindrical outer shape at its portion on the image side of the diaphragm.

28. A lens barrel comprising:
- a zoom system, a diaphragm and a focus system arranged from object to image;
- a first arc-formed drive portion for driving the zoom system;
- a second arc-formed drive portion for driving the focus system; and
- a third arc-formed drive portion for driving the movable diaphragm, wherein said first, second and third driving portions are arranged along an outer periphery of said barrel on the image side of said diaphragm so that an outer shape of the lens barrel with said first, second and third driving portions is almost cylindrical.

29. A lens barrel comprising:
- a first fixed system, a zoom system, a diaphragm, a second fixed system, and a focus system arranged from object to image;
- a first arc-formed drive portion for driving the zoom system:
- a second arc-formed drive portion for driving the focus system; and
- a third arc-formed drive portion for driving the diaphragm,
wherein said first, second and third driving portions are arranged along an outer periphery of said barrel on the image side of said diaphragm so that an outer shape of the lens barrel with said first, second and third driving portions is almost cylindrical.

30. A lens barrel comprising:
- a zoom system, a diaphragm and a focus system from object to image;
- a first arc-formed drive portion for driving the zoom system;
- a second arc-formed drive portion for driving the focus system; and
- a third arc-formed drive portion for driving the diaphragm,
wherein the lens barrel has an almost cylindrical outer shape at its portion on the image side of the diaphragm and said first, second and third driving portions are arranged along an outer periphery of said portion on the image side of said diaphragm so that an outer shape of the lens barrel with said first, second and third driving portions is almost cylindrical.

31. A lens barrel comprising:
- a first fixed system, a zoom system, a diaphragm, a second fixed system, and a focus system from object to image;
- a first arc-formed drive portion for driving the zoom system;

a second arc-formed drive portion for driving the focus system; and a third arc-formed drive portion for driving the diaphragm, wherein the lens barrel has an almost cylindrical outer shape at its portion on the image side of the diaphragm and said first, second and third driving portions are arranged along an outer periphery of said portion on the image side of said diaphragm so that an outer shape of the lens barrel with said first, second and third driving portions is almost cylindrical.

* * * * *

UNITED STATES PATENT AND TRADEMARK OFFICE
CERTIFICATE OF CORRECTION

PATENT NO. : 6,292,308 B1
DATED : September 18, 2001
INVENTOR(S) : Masahiko Tsuzuki et al.

It is certified that error appears in the above-identified patent and that said Letters Patent is hereby corrected as shown below:

Column 3,
Line 18, after "motor 9" delete "of an arc form".

Column 5,
Line 62, delete "follows," and insert -- follows. --.

Column 8,
Line 16, delete "is disposed" and insert -- are disposed --.
Line 28, delete "claim 5" and insert -- claim 8 --.
Line 34, after "a" delete -- shaft --.

Signed and Sealed this

Seventeenth Day of December, 2002

JAMES E. ROGAN
*Director of the United States Patent and Trademark Office*